(12) United States Patent
Jha et al.

(10) Patent No.: US 9,963,245 B2
(45) Date of Patent: May 8, 2018

(54) EXTERIOR AIRCRAFT LIGHT UNIT AND AIRCRAFT COMPRISING THE SAME

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days. days.

(21) Appl. No.: 15/348,014

(22) Filed: Nov. 10, 2016

(65) Prior Publication Data

US 2017/0137148 A1 May 18, 2017

(30) Foreign Application Priority Data

Nov. 13, 2015 (EP) .................................... 15194535

(51) Int. Cl.

| | |
|---|---|
| *B64D 47/06* | (2006.01) |
| *F21V 29/89* | (2015.01) |
| *F21V 7/04* | (2006.01) |
| *F21Y 113/13* | (2016.01) |
| *F21Y 115/10* | (2016.01) |

(52) U.S. Cl.
CPC .............. *B64D 47/06* (2013.01); *F21V 7/04* (2013.01); *F21V 29/89* (2015.01); *B64D 2203/00* (2013.01); *F21Y 2113/13* (2016.08); *F21Y 2115/10* (2016.08)

(58) Field of Classification Search
CPC ...... B64D 47/06; B64D 2203/00; F21V 29/89; F21V 7/04
See application file for complete search history.

(56) References Cited

U.S. PATENT DOCUMENTS

| | | |
|---|---|---|
| 6,183,100 B1 | 2/2001 | Suckow |
| 6,886,962 B2 | 5/2005 | Suehiro |
| 9,109,781 B2 | 8/2015 | Holder |
| 9,731,841 B2 * | 8/2017 | Jha .......................... B64D 47/06 |

(Continued)

FOREIGN PATENT DOCUMENTS

| | | |
|---|---|---|
| CN | 204100120 U | 1/2015 |
| EP | 2924340 A1 | 9/2015 |

(Continued)

OTHER PUBLICATIONS

"Bright Future for Reflector LEDS". Eureka, Findlay Publications LTD., Dataford, GB, vol. 21, No. 5, May 1, 2001.

(Continued)

*Primary Examiner* — Anne Hines
(74) *Attorney, Agent, or Firm* — Cantor Colburn LLP

(57) ABSTRACT

An exterior aircraft light unit includes a plurality of LEDs; a support plate for supporting the plurality of LEDs, the support plate having a main plane of extension, wherein the support plate has a curved, concave LED support surface, substantially orthogonal to the main plane of extension, and wherein the plurality of LEDs are arranged along the curved, concave LED support surface; and a reflector, facing the plurality of LEDs and shaped to reflect light from the plurality of LEDs past the support plate towards an outside of the exterior aircraft light unit.

16 Claims, 3 Drawing Sheets

(56) References Cited

U.S. PATENT DOCUMENTS

| | | | |
|---|---|---|---|
| 2002/0093823 A1 | 7/2002 | Rohlfing | |
| 2006/0109475 A1* | 5/2006 | Misener | G01N 21/474 |
| | | | 356/446 |
| 2007/0007351 A1* | 1/2007 | Hsiao | G06K 7/10574 |
| | | | 235/462.35 |
| 2007/0164875 A1* | 7/2007 | Fredericks | B64D 47/06 |
| | | | 340/815.45 |
| 2008/0310177 A1* | 12/2008 | Clark | B60Q 3/43 |
| | | | 362/471 |
| 2011/0305014 A1* | 12/2011 | Peck | F21V 5/02 |
| | | | 362/235 |
| 2013/0128570 A1* | 5/2013 | Jiang | F21V 5/04 |
| | | | 362/235 |
| 2013/0161082 A1* | 6/2013 | Hardin | F21S 48/234 |
| | | | 362/514 |
| 2016/0170119 A1* | 6/2016 | Hao | A42B 3/044 |
| | | | 362/565 |

FOREIGN PATENT DOCUMENTS

| | | | |
|---|---|---|---|
| WO | 0140703 | A1 | 6/2001 |
| WO | 2013066180 | A1 | 5/2013 |

OTHER PUBLICATIONS

European Search Report for Application No. 15194535.9-1754. dated May 3, 2016. 6 pages.

\* cited by examiner

EXTERIOR AIRCRAFT LIGHT UNIT AND AIRCRAFT COMPRISING THE SAME

FOREIGN PRIORITY

This application claims priority to European Patent Application No. 15 194 535.9 filed Nov. 13, 2015, the entire contents of which is incorporated herein by reference.

TECHNICAL FIELD

The present invention relates to exterior aircraft lighting. In particular, it relates to exterior aircraft light units satisfying high light intensity requirements and being compact in size.

BACKGROUND

Almost all aircraft are equipped with exterior light units. In particular, large passenger air planes are provided with a wide variety of exterior light units. The light units are provided for a wide variety of different purposes, such as for allowing the passengers and/or air crew to view the outside, for passive visibility, for signalling purposes, etc. Examples of such exterior light units are navigation or position lights, beacon lights, anti-collision lights or strobe lights, wing scan lights, landing lights, taxi lights, runway turn-off lights, etc. For some exterior lights, it is desired and/or required by regulations to have high emission intensities in particular output regions or directions, such as particular output planes. In previous approaches, achieving said high emission intensities in particular output directions has resulted in large optical structures and light units. This is very cumbersome in the aircraft field, because some exterior aircraft light units must be in locations where they can be seen from many angles, resulting in disadvantageous light positions in terms of the aerodynamics and other design goals of the aircraft. In the particular case of beacon lights that are mounted to the top or the bottom of the aircraft fuselage, their large size adds substantial drag to the aircraft, thus being detrimental to the operating efficiency of the aircraft.

Accordingly, it would be beneficial to provide an exterior aircraft light unit that is capable of providing a high light intensity output at a compact size. Further, it would be beneficial to provide an aircraft with such exterior lighting.

SUMMARY

Exemplary embodiments of the invention include an exterior aircraft light unit, comprising a plurality of LEDs; a support plate for supporting the plurality of LEDs, the support plate having a main plane of extension, wherein the support plate has a curved, concave LED support surface, substantially orthogonal to the main plane of extension, and wherein the plurality of LEDs are arranged along the curved, concave LED support surface; and a reflector, facing the plurality of LEDs and shaped to reflect light from the plurality of LEDs past the support plate towards an outside of the exterior aircraft light unit.

Exemplary embodiments of the invention allow for achieving a high light yield, i.e. for achieving a high ratio of light used in the emission of the exterior aircraft light unit per light generated by the plurality of LEDs, while at the same time allowing for a compact design of the exterior aircraft light unit. The side-mounting of the plurality of LEDs at the support plate is an important factor in achieving a high light yield and a compact size at the same time. The plurality of LEDs are considered side-mounted at the support plate, because they are arranged along the curved, concave LED support surface, which is oriented substantially orthogonal to the main plane of extension of the support plate and which is by definition smaller in extension in this orthogonal direction than in the dimensions of the main plane of extension of the plate-like/flat structure of the support plate. In other words, the support plate being described as a plate implies that its extension in the direction orthogonal to the main plane of extension of the support plate is much smaller than the extension of the support plate in the other two dimensions in a Cartesian coordinate system. The support plate may also be referred to as a flat structure. Accordingly, the plurality of LEDs are mounted to a curved, concave side surface of the support plate. It is pointed out that the this side surface may be an inner side surface of the support plate and may be surrounded by the support plate, as will be discussed below.

This side-mounted arrangement of the plurality of LEDs on the support plate allows for the light, reflected by the reflector, having ample space to pass the support plate towards an outside of the exterior aircraft light unit. In particular, when seen from the reflector, the support plate only obstructs little space towards the outside of the exterior aircraft light unit. In this way, the reflector can direct a high portion of the light emitted by the plurality of LEDs past the support plate and into desired output directions, leading to high usage of the emitted light. Due to their side-mounting on the support plate, the plurality of LEDs have their main light emission direction in the main plane of extension of the support plate. With the plurality of LEDs being arranged along the curved, concave LED support surface and with their main light emission directions converging as a result thereof, the reflector can have smaller extensions than the support plate in the main plane of extension and still reflect a very large portion or even all light stemming from the plurality of LEDs. This contributes to the compact design of the exterior aircraft light unit.

While obstructing only little space for the light reflection from the reflector, the support plate is still an extended structure that has space for distributed power circuitry to the plurality of LEDs and distributed heat transfer away from the plurality of LEDs. Accordingly, as compared to a mounting ring for LEDs, the support plate allows for more degrees of freedom in designing the mechanical support, the heat transfer and the power circuitry. In this way, the support plate provides a favorable compromise between design flexibility and little obstruction to reflected light. The support plate may be a printed circuit board (PCB).

As compared to prior art incandescent lights, LEDs have a small mounting surface. Hence, the usage of LEDs as light sources also contributes to keeping the support plate flat and ensuring a minimal effect on the design of the paths of reflected light. As pointed out above, the flat nature of the support plate allows for an efficient transfer of heat into the plate and away from the LEDs. This good heat conduction and the provision of an extended heat release surface allows for packing the plurality of LEDs tightly along the curved, concave LED support surface, again contributing to a compact design of the exterior aircraft light unit.

The main plane of extension of the support plate may be a horizontal plane of extension in the eventual mounting position of the exterior aircraft light unit. In this case, the plurality of LEDs are arranged along a substantially vertical surface. Their main light emission direction may be in the horizontal plane of the support plate.

According to a further embodiment, the curved, concave LED support surface has a substantially circular outline. In this way, the exterior aircraft light unit is particularly well-suited for providing a suitable output light intensity distribution in cases where the required/desired output light intensity distribution is constant for an extended azimuth angle. Examples of exterior aircraft light units having constant requirements over an extended azimuth angle are beacon lights, anti-collision lights and navigation lights.

According to a further embodiment, the curved, concave LED support surface extends along a full circumference of a circle. In other words, the curved, concave LED support surface forms a circular hole/circular opening through the support plate. In yet other words, the support plate extends around a circular hole/circular opening. In this way, a 360° light emission may be provided around an axis through said circular hole. The plurality of LEDs are thus arranged along an inner surface of the support plate, with a relatively small reflector being able to capture a large portion or even all of the light emitted by the plurality of LEDs and reflecting it into an angular range of 360°.

According to an alternative embodiment, the curved, concave LED support surface extends along a segment of a circle of between 60° and 180°, in particular of between 80° and 150°. In this way, the beneficial structure of the exterior aircraft light unit may be made use of for exterior light units that are not required/desired to have a 360° output light emission distribution. For example, the exterior aircraft light unit may be used as a taxi light providing illumination within a limited azimuth angle.

According to a further embodiment, the plurality of LEDs are directed towards a center of the circle. This directivity may refer to the mechanical arrangement of the LEDs, with respective axes orthogonal to the respective mounting planes of the LEDs and running through the respective centers of the LEDs going through the center of the circle. It is also possible that the directivity of the plurality of LEDs refers to their optical directivity, with the main light emission directions of the plurality of LEDs being directed towards the center of the circle. In this way, when seen from the center, a repeated pattern of light emission by the plurality of LEDs is provided, allowing for the usage of a reflector that also has repeated sections or a continuous design along its azimuth angle.

According to a further embodiment, the plurality of LEDs are spaced regularly along the curved, concave LED support surface. However, it is pointed out that there may also be sections with a greater LED density and sections with a lower LED density along the curved, concave LED support surface, depending on the desired/required output light intensity distribution.

According to a further embodiment, the support plate circumscribes the reflector. In this way, the curved, concave LED support surface forms an inner surface of the support plate and defines a hole/opening through the support plate. It is pointed out that the support plate circumscribing the reflector does not require this hole to be circular. It is also possible that the support plate circumscribes the reflector, with the opening through the support plate having other shapes, which may be regular, such as an elliptical shape, or irregular.

According to a further embodiment, the support plate comprises multiple partial support plates that are arranged next to each other and, potentially, mounted to each other or fixed in position with respect to each other to jointly form the support plate of the exterior aircraft light unit. Combining the support plate from multiple partial support plates may be beneficial in terms of the assembly of the exterior aircraft light unit. For example, the partial support plates may be easier to produce than an entire support plate having a hole therethrough. Also, the reflector may be more easily arranged in the middle of the support plate if two or more multiple partial support plates are arranged around the reflector and subsequently fixed to each other.

According to a further embodiment the support plate may be supported on a plurality of stilts, also referred to as a plurality of legs. In this way, the support plate may have sufficient support within the exterior aircraft light unit, with the supporting legs/stilts only posing little disturbance to the output light intensity distribution due to the small cross-section of the stilts/legs. Also, the stilts/legs may be embodied as heat transfer elements, e.g. by comprising metallic heat transfer elements, such as metallic cores. In this way, the waste heat of the plurality of LEDs does not have to be released entirely by the support plate, but can also be partially released towards the remainder of the exterior aircraft light units via the stilts/legs.

According to a further embodiment, the reflector comprises, in at least one cross-sectional plane orthogonal to the main plane of extension of the support plate, a first reflection section, adjacent to the main plane of extension of the support plate, shaped to divert light from the support plate. In other words, the first reflection section is shaped to direct light around the support plate that would be reflected onto the curved, concave LED support surface if the reflector where orthogonal to the main plane of extension in the reflection section adjacent to the main plane of extension. In this context, the term adjacent to the main plane of extension means that said portion of the reflector extends along the height of the curved, concave LED support surface and, potentially, extends somewhat beyond that height. The first reflection section be of a regular geometry, e.g. it may be an elliptical section, or may be of an irregular geometry. The first reflection section may be a freeform section, diverting the light into desired angular regions, depending on the application of the exterior aircraft light unit.

According to a further embodiment, the reflector comprises, in the at least one cross-sectional plane orthogonal to the main plane of extension of the support plate, a second reflection section, removed from the main plane of extension of the support plate, wherein the second reflection section is parabolic. The parabolic second reflection section may collimate light in the main plane of extension of the support plate. This collimation in the main plane of extension of the support plate refers to the far field effect. In the near field, the collimated light rays are parallel to the main plane of extension of the support plate and thus pass by the support plate. The parabolic second reflection section achieves a high intensity peak in the main plane of extension of the support plate, although the light from the plurality of LEDs in their main light emission direction cannot be directly reflected due to the blocking by the support plate. An LED arranged in said cross-sectional plane orthogonal to the main plane of extension of the support plate may be arranged in a focal point of the parabolic second reflection section. The reflector may have such parabolic second reflection sections in a plurality of cross-sectional planes, orthogonal to the main plane of extension, and the plurality of LEDs may respectively be arranged in the focal points of the parabolic second reflection sections. In the case of the curved, concave LED support surface being circular and the reflector being rotationally symmetric, the plurality of LEDs may be arranged along a circle of focal points of the parabolic second reflection sections. The second reflection section may be adjacent to the first reflection section.

According to a further embodiment, the reflector comprises, in the at least one cross-sectional plane orthogonal to the main plane of extension of the support plate, a third reflection section, removed from the main plane of extension of the support plate, wherein the third reflection section is shaped to reflect light from the plurality of LEDs towards the main plane of extension of the support plate and past an outside of the support plate. In other words, the third reflection section is shaped to direct light from the plurality of LEDs to cross the main plane of extension of the support plate outside of the support plate. In this way, the third reflection section allows for directing light to various angular regions and for satisfying desired/required light intensities outside of the main plane of extension, which is provided with a high light intensity via the parabolic second reflection section.

According to a further embodiment, the reflector is rotationally symmetric. In this way, the reflector provides for a reflection of the light from the plurality of LEDs that is constant throughout a 360° azimuth angle. In addition to being comparably easy to produce, such a rotationally symmetric reflector provides for consent reflection characteristics throughout a 360° azimuth angle and, thus, helps in efficiently satisfying desired/required 360° output light intensity distributions.

According to an alternative embodiment, the reflector is a segment of between 60° and 180°, in particular of between 80° and 150°, of a rotationally symmetric surface. In this way, the beneficial structure and arrangement of the reflector within the exterior aircraft light unit may also be made use of for exterior aircraft light units that have desired/required output light intensity distributions over a limited azimuth angle. Examples of such exterior aircraft light unit are taxi lights, navigation lights, and anti-collision lights.

According to a further embodiment, the reflector is symmetric with respect to the main plane of extension of the support plate. In this way, the reflector contributes to providing an output light intensity distribution that is symmetric with respect to a horizontal plane, i.e. that is the same towards an upper hemisphere and a lower hemisphere in the aircraft frame of reference. In this way, the exterior aircraft light unit is well suited as a light unit that is desired/required to have such a symmetric output light intensity distribution. Also, such an exterior aircraft light unit can be arranged on top of the aircraft and on the bottom of the aircraft, such as a top or bottom beacon light, regardless of its orientation.

According to a further embodiment, the support plate comprises a plurality of heat transport elements, arranged to transport heat away from the plurality of LEDs. The heat transport elements may be metallic heat transport elements, such as metallic wires. Such heat transport elements are efficient means of distributing the waste heat, generated by the plurality of LEDs, over the support plate for being released therefrom. The operating temperatures of the plurality of LEDs can thus be kept at acceptable levels, allowing for a dense integration of the plurality of LEDs. The plurality of heat transport elements may extend from locations close to the respective bodies of the plurality of LEDs to portions of the support plate that are suitable for heat release, such as edge portions of the support plate. It is also possible that the heat transport elements conduct the heat towards legs or stilts supporting the support plate for transporting the heat further away from the plurality of LEDs. The heat transport elements may be integrated into the support plate in a three-dimensional manner, crossing electric wires, which provide power to the plurality of LEDs, in an electrically isolated manner.

According to a further embodiment, the exterior aircraft light unit is a beacon light unit and the plurality of LEDs are red LEDs. In particular, the beacon light unit may be configured to emit flashes of red light. According to the regulations, this red flashing indicates an operating of the engines of an aircraft when on an airfield of an airport. The red LEDs may in particular emit light of the color referred to as aviation red, which is specified in the field of aircraft lighting.

According to an alternative embodiment, the exterior aircraft light unit is a beacon light unit and the plurality of LEDs are LEDs of at least two different colors, with the at least two different colors being selected from the group comprising white, red and infrared. Although not being visible to the human eye, infrared is defined as a color herein, because it refers to a particular range of wavelengths. In this way, the exterior aircraft light unit may operate with different colors at different points in time, depending on the operational circumstances. It is possible that different LEDs of the plurality of LEDs emit light of different colors, with each one LED emitting light of one particular color. However, it is also possible that some or all of the LEDs are multi-mode LEDs, being able to emit light of different colors. The color red may again refer to aviation red.

According to a further embodiment, the exterior aircraft light unit is an exterior aircraft light unit other than a beacon light unit. For example, the exterior aircraft light unit may be a navigation light unit, an anti-collision light unit, a taxi light unit, or a runway turn-off light unit. The plurality of LEDs may be configured to emit white light or red light or green light, depending on the particular application.

Exemplary embodiments of the invention further include an aircraft, such as an air plane or a helicopter, comprising at least one exterior aircraft light unit, as described in any of the embodiments above, arranged in the exterior of the aircraft. The features, modifications, and benefits, discussed above with respect to the exterior aircraft light unit, are equally applicable to the aircraft.

According to a particular embodiment, an exterior aircraft light unit, as described in any of the embodiments above, may be mounted to the top or to the bottom of a fuselage of the aircraft and may be configured as a beacon light unit.

BRIEF DESCRIPTION OF THE DRAWINGS

Further embodiments of the invention are described in detail below with reference to the figures, wherein.

DETAILED DESCRIPTION

Figure 1:
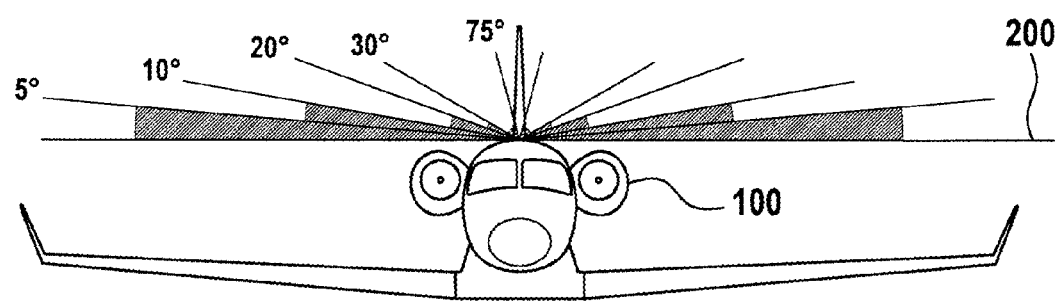
FIG. 1 shows an exemplary light intensity distribution of a beacon light unit, as required by the Federal Aviation Regulations.

FIG. 1 shows an exemplary embodiment of a light intensity distribution of a beacon light, mounted to the top of a schematically represented aircraft 100. The light intensity distribution is in accordance with the Federal Aviation Regulations (FAR) requirements for a beacon light, mounted to the top of the aircraft 100. In particular, the light intensity distribution fulfils FAR 25.1401 requirements. The light intensity distribution is shown as an angular distribution with respect to the horizontal plane 100. In particular, it is shown in a vertical cross-sectional plane that is orthogonal to the longitudinal extension of the aircraft fuselage. However, as the FAR requirements are described as a rotationally symmetric distribution, i.e. as a distribution that is identical in all viewing directions from the beacon light, the shown light intensity distribution would look the same in all vertical cross-sections through the center of the beacon light.

The light intensity distribution is as follows. A light intensity of 400 cd is required for an angular range of between 0° and 5° with respect to the horizontal plane 200. A light intensity of 240 cd is required in an angular range of between 5° and 10° with respect to the horizontal plane 200. A light intensity of 80 cd is required in an angular range between 10° and 20° with respect to the horizontal plane 200. A light intensity of 40 cd is required in an angular range of between 20° and 30° with respect to the horizontal plane 200. A light intensity of 20 cd is required in an angular range of between 30° and 75° with respect to the horizontal plane 200. Accordingly, the required light intensity values, shown as angular sectors in FIG. 1, represent minimum light intensity values, required by the FAR. As the horizontal plane 200 is the plane with the highest required light intensity, it can also be referred to as main light output plane.

Figure 2:
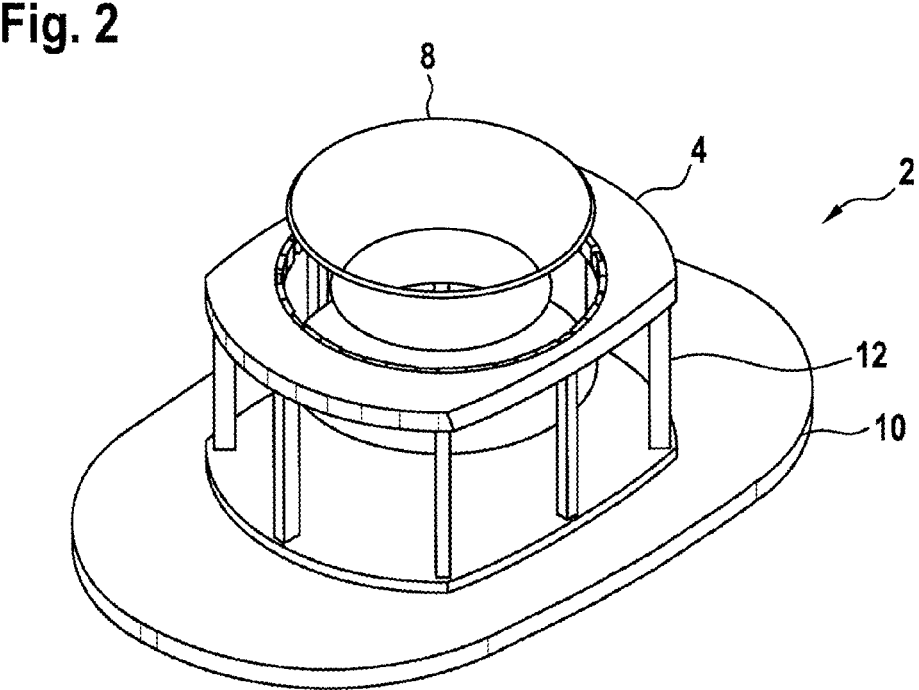
FIG. 2 shows a perspective view of an exemplary embodiment of an exterior aircraft light unit in accordance with exemplary embodiments of the invention.

FIG. 2 shows a perspective view of an exterior aircraft light unit 2 in accordance with exemplary embodiments of the invention. In the exemplary embodiment of FIG. 2, the exterior aircraft light unit 2 is a beacon light unit. This beacon light unit may for example be mounted to the top of an aircraft fuselage and provide a required beacon light intensity distribution, such as for example illustrated in FIG. 1.

The exterior aircraft light unit 2 has a base 10. When mounted to the top of an aircraft fuselage, the base 10 forms the lowermost portion of the exterior aircraft light unit 2. It may be mounted to the aircraft fuselage via threaded connection elements, such as screws, or via rivets or via any other suitable coupling elements.

The exterior aircraft light unit 2 further comprises a support plate 4 for supporting a plurality of LEDs. The support plate 4 is supported on the base 10 via a plurality of legs 12, also referred to as stilts 12. In the exemplary embodiment of FIG. 2, the support plate 4 is supported on the base 10 via eight stilts 12. The support plate 4 is a generally flat structure, extending generally in parallel to the base 10. Accordingly, the support plate 4 is oriented generally horizontally, when the exterior aircraft light unit 2 is mounted to the top of an aircraft fuselage. The base 10 and the support plate 4 have similar, generally oval outlines. However, the base 10 is large than the support plate 4.

The support plate 4 has a much greater extension in both dimensions of the horizontal plane, as compared to its vertical extension. The horizontal plane is therefore considered the main plane of extension of the support plate 4. The support plate 4 has a circular opening, also referred to as circular hole herein, extending through the support plate 4, which will be described in greater detail below.

Within the circular opening to the support plate 4, a rotationally symmetric reflector 8 is arranged. The rotationally symmetric reflector 8 is also supported on the base 10 via appropriate support elements (not shown). The reflector 8 is also described in greater detail below.

The support plate 4 of the exterior aircraft light unit 2 of FIG. 2 is shown in FIG. 3, again in a perspective view. The support plate 4 has an upper surface 40, an outer side surface 44, and a lower surface, which is not shown due to the perspective viewing direction of FIG. 3. The height extension of the outer side surface 44 is much smaller than the extension of the upper surface 40 in any of its directions of extension. Accordingly, the support plate 4 is a plate-like, flat structure. The outer contour of the upper surface 40 has two generally straight portions and two curved portions, respectively opposite of each other. In this way, the support plate 4 has an overall oval shape, which is a kind of hybrid between a rectangle and an ellipse.

A circular hole 46, also referred to as circular opening 46, extends through the support plate 4. Due to this hole, a circular inner surface 42 is provided in the support plate 4. This circular inner surface 42 is an example of a curved, concave LED support surface. A plurality of LEDs 6 are arranged along and mounted to the circular LED support surface 42. The plurality of LEDs 6 are spaced at regular intervals and together cover roughly ⅓ of the circular LED support surface 42 in the exemplary embodiment of FIG. 3. It is pointed out that other LED densities and arrangements are possible as well.

Figure 3:
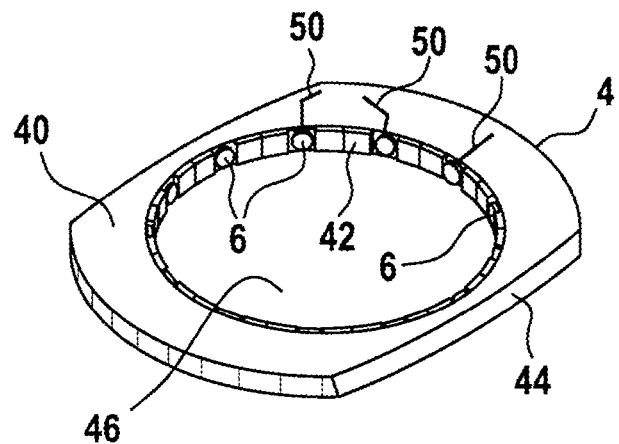
FIG. 3 shows the support plate of the exterior aircraft light unit of FIG. 2 in a perspective view.

The support plate 4 further comprises a plurality of heat transport elements 50. In particular, in the exemplary embodiment of FIG. 3, each of the plurality of LEDs is provided with an associated heat transport element 50. For clarity of illustration, only three of those heat transport elements 50 are shown in FIG. 3. Each of the heat transport elements 50 extends from a location close to the associated LED 6 to a location close to the periphery of the support plate 4. In the exemplary embodiment of FIG. 3, the heat transport elements 50 are metallic wires. Due to their good heat conductivity, the heat transport elements 50 effectively transport waste heat away from the plurality of LEDs 6 and distribute said waste heat across the support plate 4 for being released to the environment around the support plate 4. In this way, an efficient regulation of the operating temperatures of the plurality of LEDs 6 is established. It is further possible that the heat transport elements 50 are in a heat conduction relationship with heat transport elements in the plurality of legs 12, which are shown in FIG. 2, in order to transport the heat further away from the plurality of LEDs 6.

Figure 4:
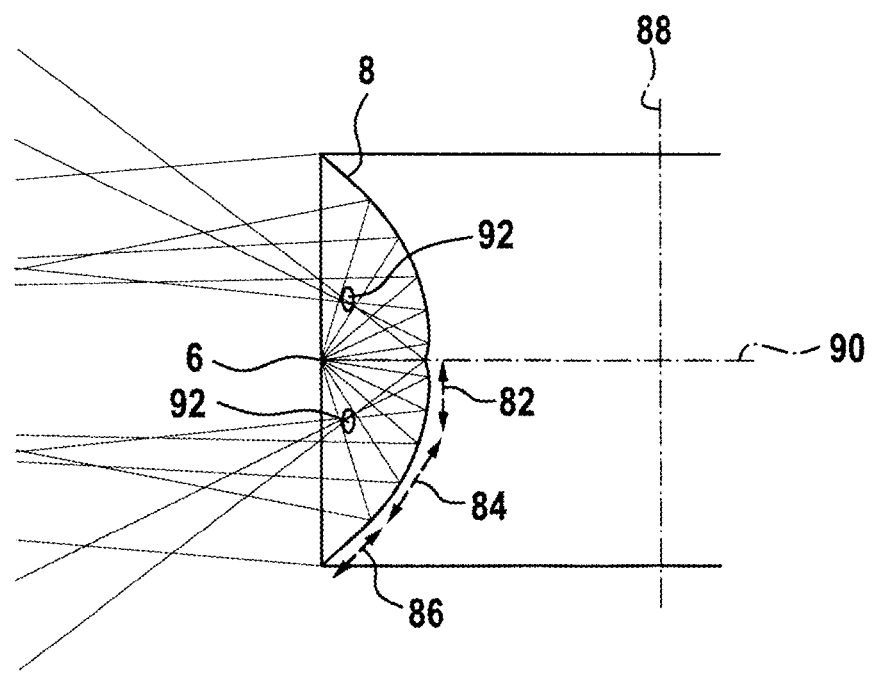
FIG. 4 shows the reflector of the exterior aircraft light unit of FIG. 2 in a cross-sectional view.

FIG. 4 shows a cross-sectional view of the reflector 8 of the exterior aircraft light unit 2 of FIG. 2. The cross-sectional plane of FIG. 4 is a vertical plane, i.e. a plane orthogonal to the main plane of extension of the support plate 4. The reflector 8 is rotationally symmetric around an axis of rotation 88, with the reflector, which reflects the light from the plurality of LEDs 6, being an outer surrounding surface. Further, the reflector 8 is symmetric with respect to a plane of symmetry 90, orthogonal to the axis of rotation 88. The plane of symmetry 90 coincides with the main plane of extension of the support plate 4, as will become apparent in more detail in FIG. 5.

The plane of symmetry 90 divides the reflector 8 into a lower portion and an upper portion, disposed below and above the plane of symmetry 90, respectively. As these two portions are symmetric with respect to each other, only the lower portion will be described in detail.

The reflector 8 comprises a first reflection section 82, a second reflection section 84, and a third reflection section 86 below the plane of symmetry 90 in the cross-sectional plane of FIG. 4.

The first reflection section 82 extends from the plane of symmetry 90 downwards. The first reflection section 82 is elliptical. The elliptical first reflection section 82 is arranged such that the LED 6, which is disposed in the depicted cross-sectional plane, is positioned in a focal point of the elliptical first reflection section 82. The first reflection section 82 has a second focal point 92, located below the plane of symmetry 90. The first reflection section 82 reflects the light, coming from the LED 6, past the LED 6 (and thus past the support plate 4) via the focal point 92. In this way, the light reflected by the first reflection section 82 is not blocked by the support plate 4 and is distributed over a fairly wide angular range. It is pointed out that it is also possible to bundle the light hitting the first reflection section 82 into a more narrow angular region.

The second reflection section 84 is positioned adjacent to the first reflection section 82, in particular below the first reflection section 82 in the exemplary embodiment of FIG. 4. The second reflection section 84 is parabolic, with the LED 6 of the depicted cross-sectional plane being arranged in the focal point of the second reflection section 84. In this way, the second reflection section 84 parallelizes or nearly parallelizes light emitted from the LED 6, as is illustrated by two exemplary light rays that hit the second reflection section 84 and that are nearly made parallel by the reflector 8. After being reflected by the second reflection section 84, the light rays are closely or entirely parallel with the plane of symmetry 90. Accordingly, they leave the exterior aircraft light unit 2 in an almost or entirely horizontal manner. In this way, these light rays generate a peak in the output light intensity distribution of the exterior aircraft light unit 2 in or closely around the horizontal plane, i.e. in or closely around the main plane of extension of the support plate 4.

The third reflection section 86 is arranged adjacent to the second reflection section 84 and is further removed from the plane of symmetry 90 than the second reflection section 84, in particular arranged below the second reflection section 84. The third reflection section 86 reflects the light from the LED 6 towards the outside of the exterior aircraft light unit 2 in a manner angled towards the top in the viewing direction of FIG. 4. In particular, the light reflected by the third reflection section 86 crosses the plane of symmetry 90, which coincides with the main plane of extension of the support plate 4, outside of the outer side surface of the support plate 4. In this way, the light reflected by the third reflection section 86 contributes to the output light intensity distribution of the exterior aircraft light unit 2 in angular ranges somewhat inclined with respect to the horizontal plane.

In the exemplary embodiment of FIG. 4, the first reflection section 82 extends within an angular range of between 0 and 25-35° with respect to the main plane of extension of the support plate 4. The second reflection section 84 extends within an angular range of between 25-35° and 65-75° with respect to the main plane of extension of the support plate 4. The third reflection section 86 extends within an angular range of 65–75° and 85-90° with respect to the main plane of extension of the support plate 4. In this way, almost all or even all light emitted by the LED 6 in the depicted cross-sectional plane is made use of for the output light intensity distribution of the exterior aircraft light unit 2, while a large portion of the light is used for generating a peak in the output light intensity distribution around the horizontal plane.

The upper portion of the reflector 8 is a mirror image of the described lower portion of the reflector 8, with the particulars of the reflection of the light emitted by the LED 6 also being a mirror image of the lower portion. The detailed description of the different reflection sections is not repeated, as it is apparent to the skilled person.

Figure 5:
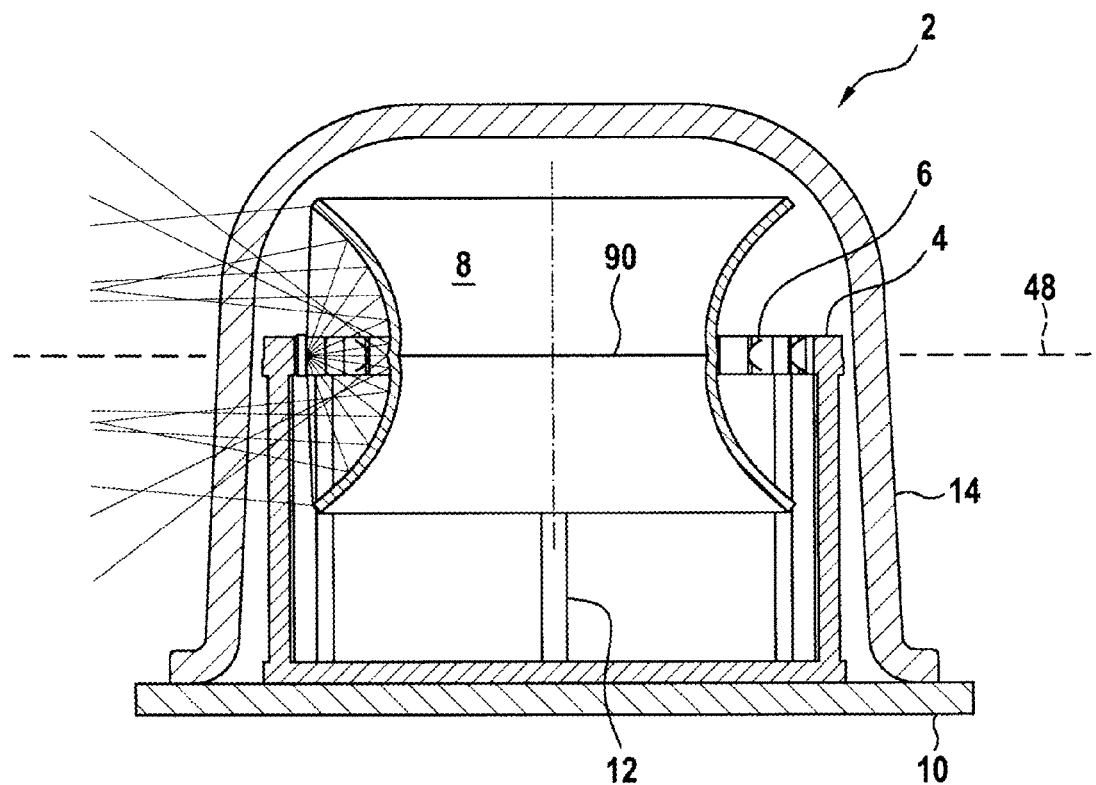
FIG. 5 shows the exterior aircraft light unit of FIG. 2 in a cross-sectional view.

FIG. 5 shows a vertical cross-sectional view through the exterior aircraft light unit 2 of FIG. 2. The elements described with respect to FIGS. 2 to 4 are provided with the same reference numerals, and the description of their structure and characteristics is not repeated. In FIG. 5, the main plane of extension of the support plate 4 is shown as a dashed line, indicated with reference numeral 48. As discussed above and as is apparent from FIG. 5, the main plane of extension 48 of the support plate 4 is a horizontal plane and coincides with the plane of symmetry 90 of the reflector 8.

FIG. 5 also shows a cover lens 14 of the exterior aircraft light unit 2. The cover lens 14 is a transparent structure that allows for the light, reflected by the reflector 8, to pass through and to form the output light intensity distribution of the exterior aircraft light unit 2. Moreover, the cover lens 14 protects the other components of the exterior aircraft light unit 2 from environmental influences, such as rain and snow.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light unit, comprising:
    a plurality of LEDs,
    a support plate for supporting the plurality of LEDs, the support plate having a main plane of extension,
    wherein the support plate has a curved, concave LED support surface, substantially orthogonal to the main plane of extension, and
    wherein the plurality of LEDs are arranged along the curved, concave LED support surface, and
    a reflector, facing the plurality of LEDs and shaped to reflect light from the plurality of LEDs past the support plate towards an outside of the exterior aircraft light unit.

2. The exterior aircraft light unit according to claim 1, wherein the curved, concave LED support surface has a substantially circular outline.

3. The exterior aircraft light unit according to claim 1, wherein the curved, concave LED support surface extends along a full circumference of a circle.

4. The exterior aircraft light unit according to claim 1, wherein the curved, concave LED support surface extends along a segment of a circle of between 60° and 180°, in particular of between 80° and 150°.

5. The exterior aircraft light unit according to claim 3, wherein the plurality of LEDs (6) are directed towards a center of the circle.

6. The exterior aircraft light unit according to claim 3, wherein the plurality of LEDs (6) are directed towards a center of the circle.

7. The exterior aircraft light unit according to claim 1, wherein the support plate circumscribes the reflector.

8. The exterior aircraft light unit according to claim 1, wherein the reflector comprises, in at least one cross-sectional plane orthogonal to the main plane of extension of the support plate, a first reflection section, adjacent to the main plane of extension of the support plate, shaped to divert light from the support plate.

9. The exterior aircraft light unit according to claim 8, wherein the reflector comprises, in the at least one cross-sectional plane orthogonal to the main plane of extension of the support plate, a second reflection section, removed from the main plane of extension of the support plate, in particular adjacent to the first reflection section, wherein the second reflection section is parabolic.

10. The exterior aircraft light unit according to claim 9, wherein the reflector comprises, in the at least one cross-sectional plane orthogonal to the main plane of extension of the support plate, a third reflection section, removed from the main plane of extension of the support plate, in particular adjacent to the second reflection section, wherein the third reflection section is shaped to reflect light from the plurality of LEDs towards the main plane of extension of the support plate and past an outside of the support plate.

11. The exterior aircraft light unit according to claim 1, wherein the reflector is rotationally symmetric.

12. The exterior aircraft light unit according to claim 1, wherein the reflector is symmetric with respect to the main plane of extension of the support plate.

13. The exterior aircraft light unit according to claim 1, wherein the support plate comprises a plurality of heat transport elements, such as metallic heat transport elements, arranged to transport heat away from the plurality of LEDs.

14. The exterior aircraft light unit according to claim 1, wherein the exterior aircraft light unit is a beacon light unit and wherein the plurality of LEDs are red LEDs.

15. The exterior aircraft light unit according to claim 1, wherein the exterior aircraft light unit is a beacon light unit and wherein the plurality of LEDs are LEDs of at least two different colors, with the at least two different colors being selected from the group comprising white, red and infrared.

16. An aircraft comprising at least one exterior aircraft light unit according to claim 1, arranged in the exterior of the aircraft, in particular arranged on the top or at the bottom of a fuselage of the aircraft and being configured as a beacon light unit.

* * * * *